3,166,661
ELECTRIC DEVICE HAVING A MOVABLE MEMBER IN WHICH NOISE VOLTAGE IS SUPPRESSED
Masanori Yasui and Tatsuo Yamazaki, Tokyo, Japan, assignors to Toa Denpa Kogyo Co., Ltd., Tokyo, Japan, a corporation of Japan
Filed June 21, 1960, Ser. No. 37,761
Claims priority, application Japan, June 27, 1959, 34/20,831
4 Claims. (Cl. 200—166)

The invention relates to an electric device having a movable member which is adapted to prevent the generation of noise voltage which may be caused by the electrostatic charge of an insulating material present in the vicinity of the movable member in the operation of said apparatus. This device may be used for a switch, a converter and other various electric apparatuses as will become apparent from the explanation made hereinafter.

In a structure having a movable member provided with a contacting point and fixed in insulated relation at its end onto the body of an apparatus having a circuit in which said contact is present, it is unavoidable to generate a large noise voltage when the resistance in the circuit is increased, regardless of how completely the apparatus may be shielded from an alternating electric field. This phenomenon occurs similarly in a converter of vibrating capacity having vibrating electrode plates insulatingly supported on the body of an electric apparatus. Consequently, for example, in a chopper for converting very low direct current to alternating current, the phenomenon defines a limit in the use of the chopper in a high resistance circuit, and, in a converter of vibrating capacity, the lowest signal level which can be converted is necessarily limited by the degree of noise voltage occurring. In other words, when the noise is great, low signal cannot be clearly distinguished due to the interference of noise, and hence the signal must be of a level higher than a certain limit.

The production of noise voltage as above described is due to the fact that the insulating plate used for insulatingly supporting a member provided with a contacting point is electrostatically charged by fricion or mechanical deformation to produce an electric field near the movable member and an electric voltage is produced in the circuit of the contacting point by the motion of the member having the contacting point in said electric field.

The object of the present invention is to provide a switch and a converter of high insulation which produce practically no noise voltage. For attaining this object, the present invention is characterized by providing a thin layer of electrically conductive material on the entire surface or within a plate of substantial insulation which is used for supporting a movable member or members of a switch or a converter on the body of the apparatus.

Another characteristic of the present invention is to provide a thin conductive layer on an insulating member placed near a movable member of a switch or a converter. It is often the case that there is provided an insulating member near a movable member of a switch or a converter. In such a case, if said insulating member is charged with electricity of relatively high voltage, it will cause an electric field which will cause noise voltage. The provision of a thin conductive layer on said insulating member will prevent such noise voltage.

The above mentioned thin conductive layer may be provided by any desired means, but one of the preferred methods is to coat a part of the surface of an insulating member by spattering of metal.

The thin conductive layer does not decrease the insulating property of the insulating member yet it decreases greatly the electrostatic field produced by static charge on the insulating member and consequently prevents the production of noise voltage which may be otherwise caused.

An insulating member of low insulating resistance provides a low electric charge but such low insulating member cannot be used in a circuit of high resistance in which the device of this invention is to be used. Accordingly a low insulating member is outside of the scope of the subject matter of the present invention.

In the following, the present invention will be explained with reference to the drawings illustrating some embodiments of the present invention, wherein.

Figure 1:
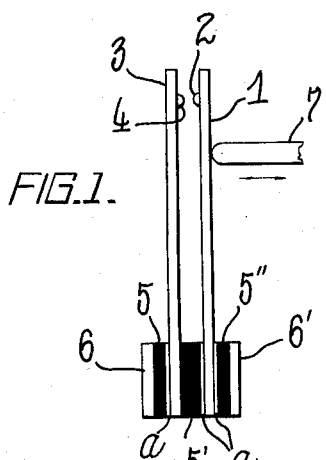
FIG. 1 is a side view illustrating the main elements of a device for opening and closing of a contact according to one embodiment of the present invention.
Figure 2:
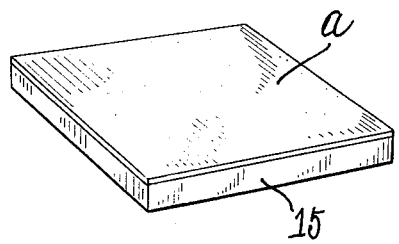
FIG. 2 is a perspective view of an insulating plate used in the device of FIG. 1 on an enlarged scale.

In a switch illustrated in FIG. 1, 1 is a movable elastic member which is provided with a contact point 2 while 3 is a fixed member provided with a contact point 4. The members 1 and 3 are located in confronting relationship and their lower ends are separated from each other by an insulating member 5' interposed between them and fixed in position by insulating members 5, 5" and fixing metallic members 6, 6'. The insulating members 5, 5' and 5" are of similar construction and they are composed of an insulating plate 15 coated on one entire surface with a thin metallic film $a$ as illustrated in FIG. 2. In FIG. 1, 7 represents an operation rod which moves in the direction of the arrow in the drawing according to signals given to an apparatus (not shown) which is associated with said rod. This apparatus may be any conventional known apparatus. When the connecting rod 7 is moved, this motion is transmitted to the movable member 1 to open or close the contact between 2 and 4 according to the signal given to the apparatus.

Figure 3:
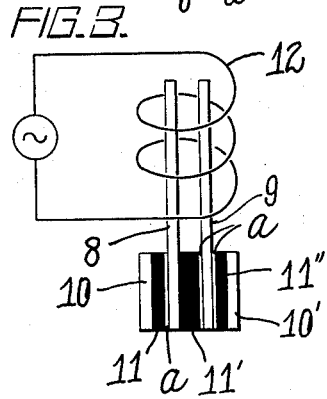
FIG. 3 is a side view illustrating the main elements of a converter of vibrating capacity.

In the converter of vibrating capacity of FIG. 3, 8 and 9 represent vibrating electrode plates of magnetic material (movable members) which constitute a capacitor of the parallel plate type. The lower ends of these plates 8 and 9 are fixed by insulating members 11, 11', 11" and metallic members 10, 10' in position in insulated relationship as illustrated in the drawing. These insulating plates are constructed in the same way as the plate of FIG. 2. A coil 12 for driving the electrode plates 8, 9 is connected to an alternating current source of desired frequency and the plates 8 and 9 are vibrated by the alternating magnetic field caused by said coil 12 to change the electrostatic capacity between them and to convert alternating current to direct current.

Figure 4:
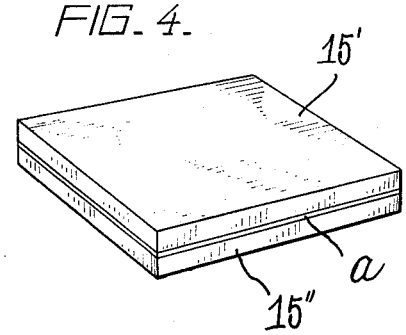
FIG. 4 is a perspective view of an insulating plate comprising a thin conductive layer interposed between two insulating layers.

FIG. 4 is an insulating plate of another type. In this embodiment, the insulating plate has a thin metallic layer $a$ interposed between two insulating layers 15', 15". This plate exhibits the effect of preventing the insulating layer from being charged with electrostatic charge and can also be used in the devices of FIG. 1 and FIG. 3 similarly as the insulating plate of FIG. 2.

Figure 5:
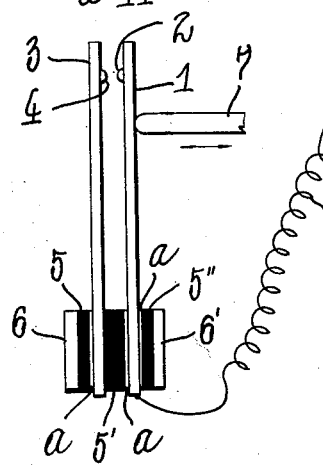
FIG. 5 is a side view of a device which is similar to FIG. 1 but is further provided with an insulating means placed near a movable member of said device.

FIG. 5 illustrates a device which is similar to that of FIG. 1 but is further provided with an insulating means placed near the movable contact 2. In the drawing, 16 is a highly insulated terminal located near the switch of FIG. 1 and is insulated with insulating members 17, 17' and fixed in position by fixing metallic members 18, 18' in cooperation with said insulating members 17, 17'. The insulating members 17, 17' are insulating members of the type as illustrated in FIG. 2, that is, an insulating plate having a thin conductive layer on one surface for the prevention of electric charge. 19 is a lead wire connecting the movable contact member 1 to the terminal 16.

As can be seen from the above explanation, the device of the present invention can be used effectively as a matter of course for relays provided with a switch, choppers for converting current from direct to alternating, converters of vibrating capacity, and also generally in all other electric instruments and machineries, for example, those for metering and signal indicating, which have a circuit of high resistance wherein the ends of movable members are fixed in highly insulated condition. The insulating plate of FIG. 2 may be coated with conductive layers $a$ on both surfaces, or the coating may be applied only to a part of one surface leaving a part not coated with the conductive layer.

What we claim is:

1. An electrical device for use in a high resistance circuit, said device comprising a plurality of electrically conducting members at least one of which is movable, insulating means in contact with and supporting said members such that the movable member moves in a zone proximate the insulating means, said insulating means including an insulating member having opposite side surfaces of relatively broad area with dimensional extent in two dimensions and an edge surface joining the side surfaces, said insulating member including an electrically conductive layer constituting in entirety one of the side surfaces of the insulating member, the movable of said electrically conducting members being secured to the insulating member and extending across the insulating member along one entire dimensional extent thereof, said conductive layer being effective by virtue of its coverage to reduce static charge on said insulating member whereby noise voltage produced by movement of said movable member in the field of said charge is suppressed.

2. An electrical device as claimed in claim 1, wherein said movable member is connected to and is in contact with the insulating member on the side thereof constituted by said electrically conductive layer.

3. An electrical device as claimed in claim 1, wherein said insulating means further comprises a second insulating member identical to the first, said movable member being interposed between the insulating members in contact with the surfaces of the insulating members constituted by the conductive layers.

4. An electrical device for use in a high resistance circuit, said device comprising a plurality of electrically conducting members at least one of which is movable, insulating means in contact with and supporting said members such that the movable member moves in a zone proximate the insulating means, said insulating means including an insulating member having opposite side surfaces of relatively broad area with dimensional extent in two dimensions and an edge surface joining the side surfaces, said insulating member including an electrically conductive layer embedded in said insulating member and extending to the edge surface so as to be coextensive in area with the side surfaces, the movable of said electrically conducting members being secured to the insulating member and extending across the insulating member along one entire dimensional extent thereof, said conductive layer being effective by virtue of its coverage to reduce static charge on said insulating member whereby noise voltage produced by movement of said movable member in the field of said charge is suppressed.

References Cited by the Examiner

UNITED STATES PATENTS

| | | | |
|---|---|---|---|
| 2,229,585 | 1/41 | Osenberg | 200—166 |
| 2,294,482 | 9/42 | Siegmund | 200—166 |
| 2,329,544 | 9/43 | Larsen | 307—149 |
| 2,599,510 | 6/52 | Campbell et al. | 307—112 X |
| 2,616,994 | 11/52 | Luhn | 200—166 |
| 2,849,563 | 8/58 | Huetten et al. | 200—90 |
| 2,902,562 | 9/59 | Cann | 200—90 |
| 2,959,693 | 11/60 | Meyer | 307—105 |

BERNARD A. GILHEANY, *Primary Examiner.*

MAX L. LEVY, *Examiner.*